United States Patent [19]
Dyck et al.

[11] Patent Number: 5,519,985
[45] Date of Patent: May 28, 1996

[54] MACHINE FOR PRODUCING STRAW-FILLED TUBES OF FLEXIBLE NETTING MATERIAL

[76] Inventors: Rudolph H. Dyck, P.O. Box 665, Winters, Calif. 95694; Michael E. Dyck, 633 Gabby Rd., Arbuckle, Calif. 95912

[21] Appl. No.: 411,373
[22] Filed: Mar. 27, 1995
[51] Int. Cl.⁶ .................................................. B65B 1/24
[52] U.S. Cl. .................. 53/527; 53/529; 53/567; 100/145; 100/904
[58] Field of Search .......................... 53/459, 469, 527, 53/523, 529, 439, 567, 577, 576; 100/145, 904; 198/540, 550, 533

[56] References Cited

U.S. PATENT DOCUMENTS

| | | | |
|---|---|---|---|
| 3,593,484 | 7/1971 | Dussich | 53/527 |
| 4,256,035 | 3/1981 | Neufeldt | 100/145 |
| 4,645,064 | 2/1987 | Hayashi | 198/533 |
| 5,015,123 | 5/1991 | Houck et al. | 405/45 |
| 5,154,543 | 10/1992 | Houck et al. | 53/527 |
| 5,325,954 | 7/1994 | Crittenden et al. | 198/533 |

FOREIGN PATENT DOCUMENTS

| | | | |
|---|---|---|---|
| 1069898 | 7/1959 | France | 100/145 |
| 559070 | 4/1960 | France | 100/145 |

*Primary Examiner*—John Sipos
*Assistant Examiner*—Gene L. Kim
*Attorney, Agent, or Firm*—Lothrop & West

[57] ABSTRACT

Apparatus and method of filling tubes of flexible, large mesh, netting material with compacted rice straw, or the like. The finished straw tubes are on the order of nine inches in diameter, twenty five feet in length and thirty pounds in weight; and thus readily lend themselves to use in controlling or mitigating the effects of erosion and to promoting revegetation.

5 Claims, 3 Drawing Sheets

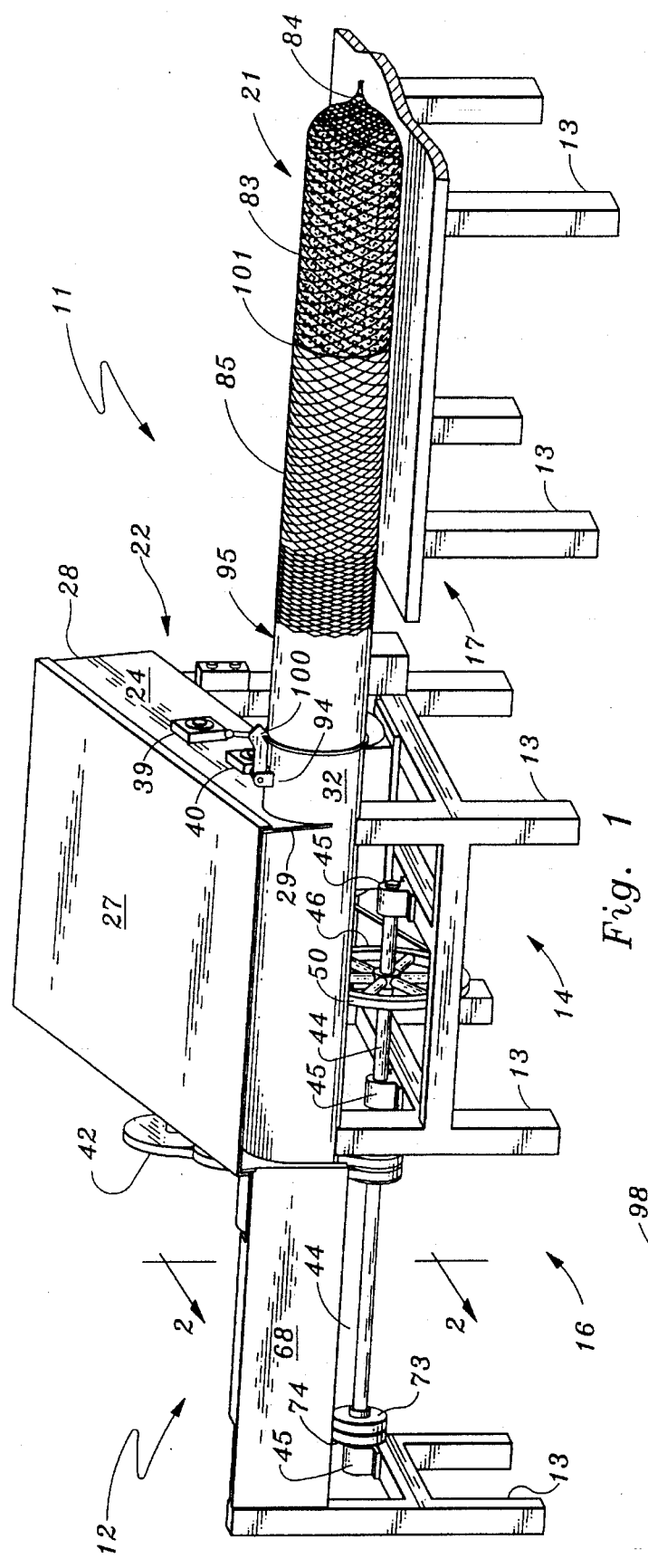
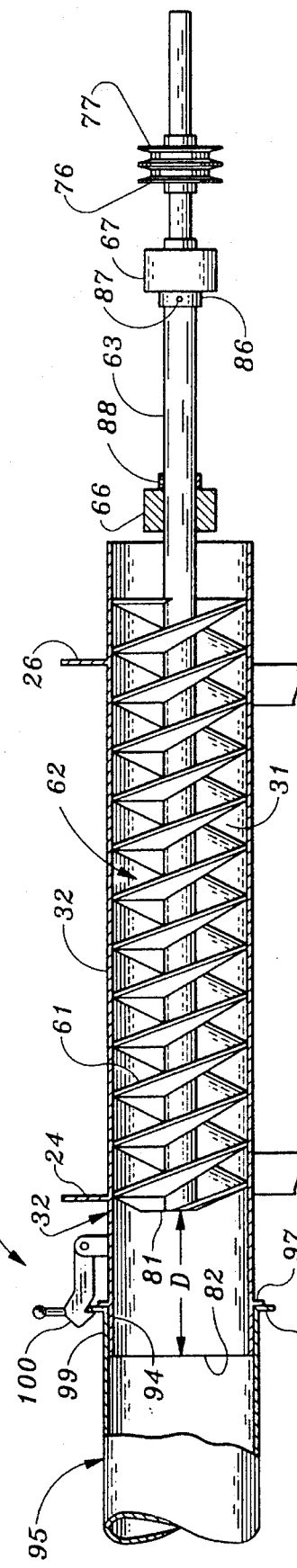
Fig. 1
Fig. 2

MACHINE FOR PRODUCING STRAW-FILLED TUBES OF FLEXIBLE NETTING MATERIAL

BACKGROUND INFORMATION

1. Field of the Invention

The invention relates to machines and methods for fabricating products for controlling erosion and, more particularly, to the fabrication of a light-weight product which effectively replaces straw bales, sandbags, willow wattles, and the like, in controlling storm-water runoff, capturing sediment and promoting revegetation, especially on sloping bare earth exposed by wildfire, road construction and excavation.

2. Prior Art

Although five patents were turned up in the course of a search, namely, Houck et al. U.S. Pat. No. 5,015,123, Willing U.S. Pat. No. 2,201,279, Bowers, U.S. Pat. No. 4,353,946, Mason, U.S. Pat. No. 4,615,642 and Bestmann, U.S. Pat. No. 5,338,131, only Houck et al. is deemed relevant.

SUMMARY OF THE INVENTION

Loose rice straw, a weed-free by-product of the rice growing industry, is fed into an auger encompassed by a steel pipe. The auger advances the straw into a tube of flexible, plastic mesh, or netting, material. The flexible mesh tube is closed on its forward end and the balance of the tube is initially gathered on the outside of the steel pipe so that when the auger continuously urges straw, first against the closed forward end and subsequently against the compressed straw in the closed forward end, the gathered portions of the tube are advanced and stripped from the pipe. As the after end of the straw-filled tube clears the pipe, the after end of the filled tube (about 25 feet long and 9 inches in diameter) is closed and the completed product is removed to allow commencement of the next cycle.

BRIEF DESCRIPTION OF THE DRAWING FIGURES

FIG. 1 is a right, front perspective showing the tube of flexible plastic netting material partially filled with straw emerging from a pipe on which the balance of the tube is gathered;

FIG. 2 is a fragmentary median, longitudinal sectional view, to an enlarged scale, of the pipe, showing the auger, auger shaft and shaft drive pulley, taken on the line 2—2 in FIG. 1;

DETAILED DESCRIPTION OF THE MACHINE AND PROCESS

Figure 3:
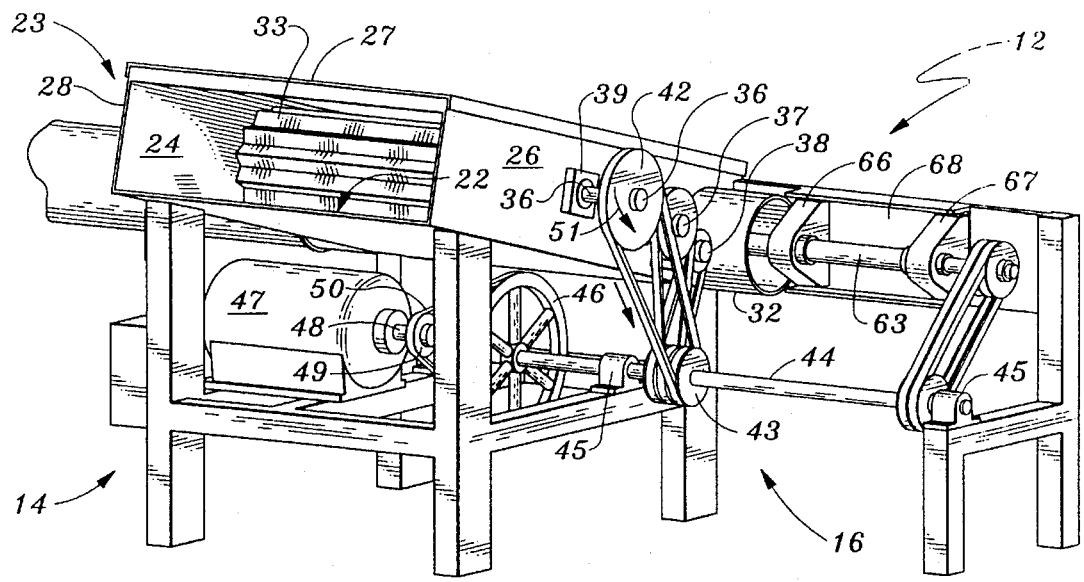
FIG. 3 is a left, rear perspective view, particularly illustrating the mechanism driving the auger and the fluted straw feed rollers.

While the machine and process of the invention can be embodied and performed in different ways, depending upon the environment and requirements of use, the invention has been embodied and the process performed in a successful fashion as described in the following description.

The machine of the invention, generally indicated by the reference numeral 11, includes an elongated frame 12 provided with the customary structural shapes 13 to afford a central framework portion 14, an after end framework portion 16 and an elongated forward end table 17 to receive and support the finished product.

The elongated forward end table 17 illustrated in FIG. 1 is broken away to reduce the extent of the figure. In practice, however, the elongated forward end table 17 is on the order of twenty five to thirty feet long since a completed straw filled tube 21 is about twenty five feet in length, and has a diameter of about nine inches.

In other words, as the straw tube 21 elongates, while being filled with compacted straw, the filled portion of the straw tube 21 is supported by the table 17 so that the finished product can readily be removed, weighing only thirty to thirty five pounds, or so, and transferred to a storage area.

In order to produce a relatively weed-free straw tube 21, rice straw is preferably although not exclusively used. Rice straw is not only virtually devoid of weed seeds, it is also relatively inexpensive, being a byproduct in the growing of rice. In most rice-growing areas of the United States, rice is gathered in late summer or fall by large harvesters which, while cutting the rice stalks and panicles, or "ears", of rice separates the rice kernels from the stalks. The rice stalks are tied in large bales and transported to wherever they are to be used.

As most clearly appears in FIGS. 1, 3, 4, 5 and 6, an inclined table 22 is mounted on the central portion 14 of the frame 12, the inclined table 22 serving to receive loose straw (not shown) from nearby bales which have been broken. The loose rice straw is fed onto the elevated ends of the inclined table 22 either by an operator wielding a hay rake or by any suitable conveyor (not shown).

In order to provide a guide chute 23 for the sloping downward movement of the loose straw, the lateral edges of the table 22 are provided with upright opposite side walls 24 and 26 and a removable top panel 27.

The inclined table 22 and guide chute 23 slope from an upper end 28, where the loose straw from the broken bales is deposited, to a lower end 29 coextensive with a longitudinal opening 31 in a pipe 32 extending in a fore and aft direction at right angles to the centerline of the table 22.

Figure 5:
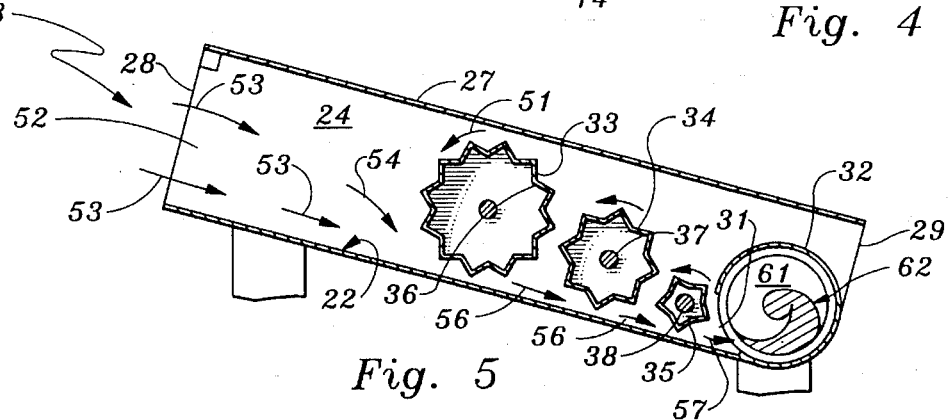
FIG. 5 is a fragmentary sectional view, to an enlarged scale, taken on the line 5—5 in FIG. 4, illustrating the relationship of the fluted straw feed rollers and the straw compacting auger.
Figure 6:
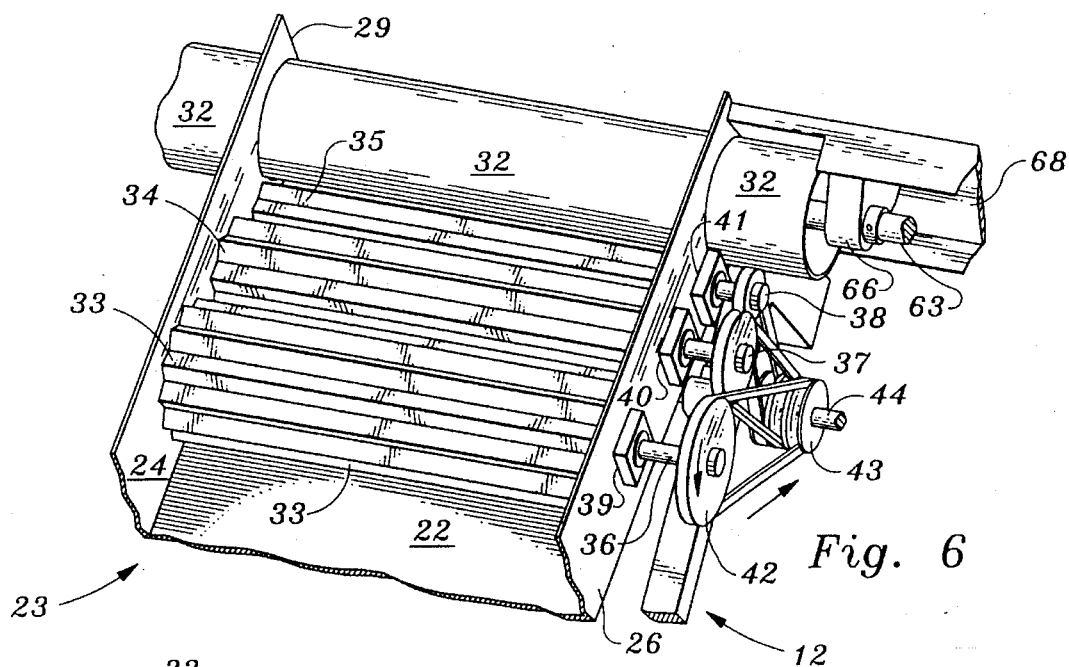
FIG. 6 is a fragmentary top rear perspective view especially illustrating the inclined table, with cover removed, the fluted straw feed rollers and the fluted rollers drive mechanism.

Although the loose straw deposited on the elevated end 28 of the table 22 is gravitationally disposed to move toward the lower end 29, thence through the opening 31 and into the interior of the pipe 32, we have found that operational efficiency is enhanced by the use of a plurality of fluted rollers 33, 34 and 35 mounted on respective shafts 36, 37 and 38 journaled on respective pairs of bearings 39, 40 and 41 mounted on guide chute side walls 24 and 26. The roller 33 is the largest, the roller 35 is the smallest and the roller 34 is intermediate in size, as shown in FIG. 5.

As best appears in FIG. 3, the shaft 36 of the largest roller 33 is rotated by a belt-driven pulley 42 which, in turn, is actuated by a pulley 43 mounted on a main pulley drive shaft 44.

The main pulley drive shaft 44 is journaled in three pillow blocks 45 (see FIG. 1) mounted on the frame 12. The portion of the main pulley drive shaft 44 located in the space below the inclined table 22 has mounted thereon a relatively large pulley 46 driven by an electric motor 47 through a motor shaft 48, pulley 49 and belt 50 (see FIGS. 3 and 4).

By adjusting the relative sizes of the motor shaft pulley 49 (small) and the shaft pulley 46 (large) the rpm of the motor shaft 48 is substantially reduced so that the speed of the main pulley drive shaft 44 is considerably less than the speed of the motor 47. By adjusting the relative sizes of the, pulley 43 (small) on the main pulley drive shaft 44 and the pulley 42 (large) on the fluted roller shaft 36 the fluted roller 33 is driven (in the counterclockwise direction of the arrow 51 in FIGS. 3 and 5) at a speed which approximately corresponds to the rate of input of the loose straw through the opening 52 at the elevated end of the guide chute 23 (in the direction of the arrows 53).

As most clearly appears in FIG. 5, the size of the largest 33 of the fluted rollers is such that it substantially spans the height of the guide chute 23. Thus, substantially all of the incoming straw is intercepted and driven downwardly and forwardly as indicated by the directional arrow 54, thence underneath the fluted rollers 33 and 34 and forwardly in the path shown by the arrows 56.

The loose straw is in a somewhat compressed condition as it emerges from underneath the largest 33 of the fluted rollers and enters the channels below the middle one 34 and the smallest 35 of the fluted rollers. The fluted ridges on the first two rollers 33 and 34 engage the straw and urge the straw forwardly, as previously noted, in the arrow path 56; and the fluted ridges on the smallest 35 of the rollers urges the straw through the longitudinal opening 31 in the pipe 32 as shown by the directional arrow 57 in FIG. 5.

In the particular embodiment of the machine disclosed herein, the peripheral velocity of the three fluted rollers 33, 34 and 35 is substantially the same. In order to achieve this uniformity, the radii of the tips of the fluted ridges and the respective pulleys on the roller shafts 36, 37 and 38 are adjusted so as to establish the desired uniform velocity of the three roller peripheries. Since these calculations are well within the purview of a person skilled in the present art, a detailed description as to how the dimensions are determined is not deemed necessary.

Upon entering the interior of the fore and aft pipe 32 through the longitudinal opening 31 (under urgency of the fluted rollers as well as the gravitational effect resulting from the downward inclination of the table 22) the somewhat compacted straw encounters the rotating, helically disposed screw 61 of an auger 62 (see FIGS. 2 and 5) within the pipe 32.

The auger shaft 63 is cantilevered in the fore and aft pipe 32, being journaled in two large, well-spaced-apart pillow block bearings 66 and 67 mounted on a sturdy fore and aft channel bar 68 forming part of the frame 12.

Driving the auger shaft 63 is a pair of V-belts 71 and 72 trained around respective pulleys 73 and 74 on the main pulley drive shaft 44 and pulleys 76 and 77 on the auger shaft 63.

It has been found that for some purposes, such as for sediment capture, it is advantageous to use a straw tube 21 which is relatively tightly compacted. Under other conditions of use, such as spreading or slowing down overland water flow, a less compacted, or more porous straw tube 21 is desirable.

In order to meet specifications which require different degrees of compactness, or conversely, porosity, we have found that by shifting the auger 62 fore or aft, the desired extent of compactness can be attained.

In other words, if it be assumed that the position of the auger 62 is in mid-position relative to the pipe 32, as shown in FIG. 2, the degree of compaction of the straw in traversing the distance will be about average, with the completed straw tube 21 weighing about thirty pounds.

If the auger 62 is shifted toward the right, as viewed in FIG. 2, the distance between the forward end 81 of the auger 62 and the forward end of the pipe 32 equals the mid-position distance D plus the amount of the shift. As a result of increasing the distance traversed by the compacted straw as it emerges from the helix on the front end 81 of the auger 62, the outer, or peripheral, wall surface of the right circular cylinder formed by the compacted straw is in frictional engagement, for a greater distance, with the internal wall surface of the pipe. As a consequence, greater frictional resistance is exerted to forward movement of the compacted straw cylinder through the pipe and increased compaction occurs as the auger continues to force straw in a forward direction, urging the previously compacted cylindrical straw plug 83 ahead of it against the closed forward end 84 of the tube 85 of flexible, plastic netting, or mesh, material. The finished product is therefore more compacted and heavier, weighing about thirty three pounds for example, about 10% more than average.

If, on the other hand, the auger 62 is shifted in a left hand direction, as viewed in FIG. 2, the resultant distance, and consequent frictional resistance to forward movement, is decreased. The friction-created "back pressure" exerted by the compacted straw plug 83 is thereby lessened and the finished straw tube 21 will be more porous and lighter in weight, by about 10%, or about twenty seven pounds, for example, when the auger 62 is shifted the maximum amount to the left, as viewed in FIG. 2.

Figure 7:
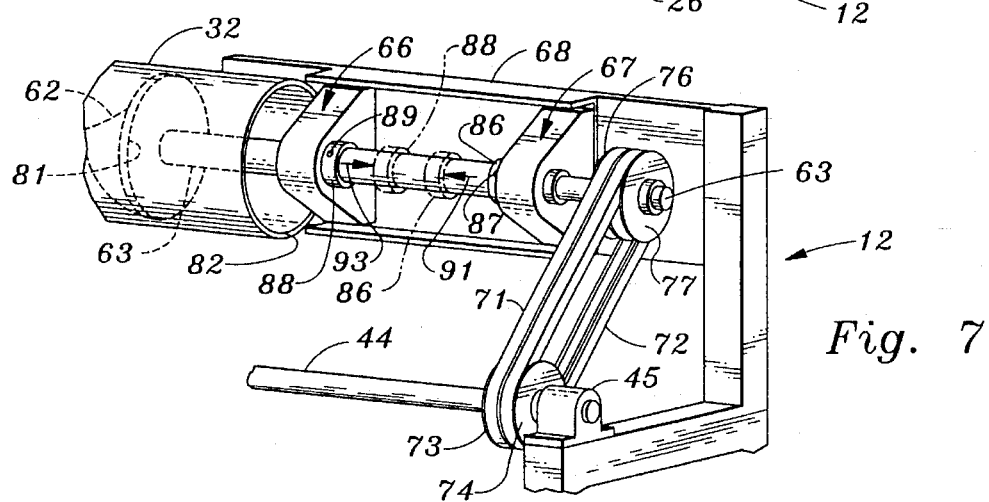
FIGS. 7 and 8 are sequential fragmentary perspective views, to an enlarged scale, of the mechanism for shifting the auger lengthwise to increase or decrease the extent of compaction of the straw in the finished straw tube.
Figure 8:
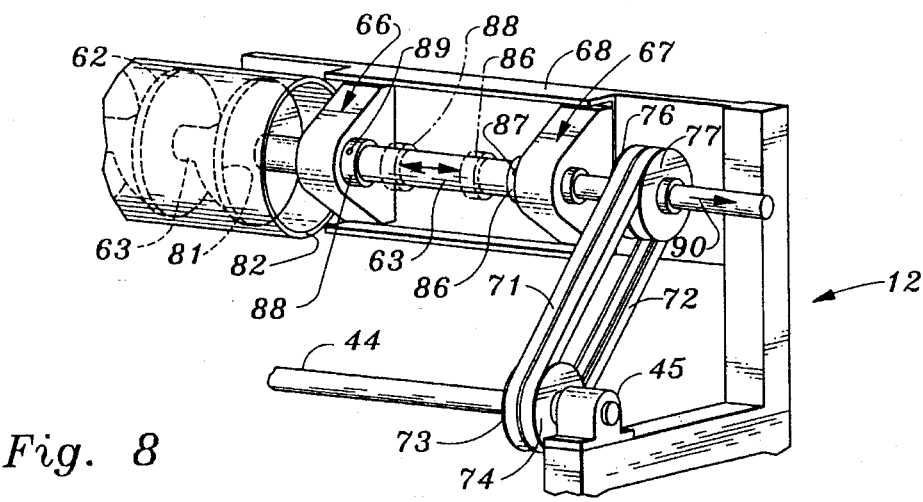

The structure and mode of operation utilized in translating the auger 62 and auger shaft 63 either fore or aft is most clearly illustrated in FIGS. 7 and 8.

Turning first to FIG. 7, auger 62 and auger shaft 63 are shown in a forward position relative to the pipe 32, corresponding to the desired location for producing a less compact final product. The auger 62 is limited against movement to the right by a right hand, or after collar 86 secured, as by a set screw 87, to the auger shaft 63. The collar 86 abuts the inner race of the bearing 67 and thereby restricts any movement of the auger shaft 63 toward the right, in an after direction.

Movement of the auger shaft toward the left, in a forward direction, is prevented by a collar 88 affixed to the auger shaft 63 by a set screw 89 and located in abutment with the inner race of the bearing 66.

In FIG. 7, the dual pulleys 76 and 77 are mounted near the after end of the auger shaft 63. In order to shift the auger shaft 63 in an after direction, as indicated by the arrow 90 in FIG. 8, the set screw 87 is loosened and the after collar 86 is translated forwardly on the auger shaft 63 in the direction of the arrow 91, in FIG. 7, thereby allowing the auger shaft 63 to be moved toward the right, as indicated by the arrow 90 in FIG. 8.

When the auger 62 and the auger shaft 63 are shifted aft, the forward collar 88 is carried along, in the direction of the arrow 93 in FIG. 7. The forward collar 88 is returned to its proper location in abutment with the inner race of the bearing 66 by loosening the set screw 89, moving the collar 88 forwardly and tightening the set screw 89. Relocation of the forward collar 88 is effected after the auger shaft 63 has been translated aft by the desired amount. At the same time, the after collar 86 is moved into abutment with the inner race of the bearing 67 and the set screw 87 is tightened.

As will be obvious, the dual pulleys 76 and 77 are detachably mounted on the auger shaft 63 and can thus be temporarily loosened from the auger shaft 63 to allow translation thereof to the desired location, after which the pulleys 76 and 77 are again made fast to the auger shaft 63.

Movement of the auger shaft 63 in a forward direction is effected in a sequence opposite to that described above.

Figure 4:
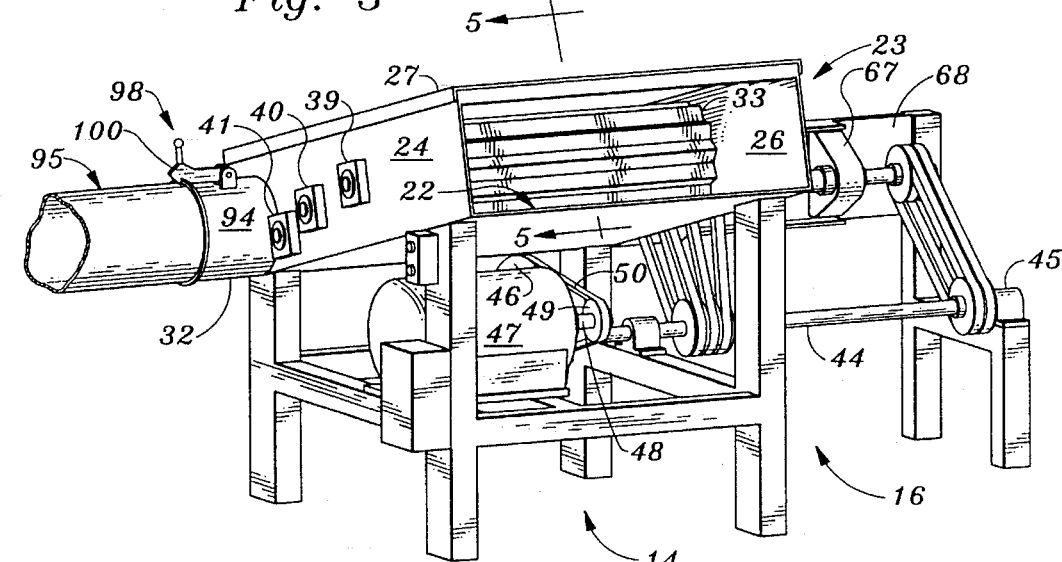
FIG. 4 is a right, rear perspective view.

Attention is now invited to the forward end portion 94 of the pipe 32, particularly as illustrated in FIGS. 1, 2 and 4, where an extension pipe 95 is detachably connected to the portion 94. A flange 96 on after end of the extension pipe 95 abuts a flange 97 on the pipe 32 and overlies the forward end portion 94 of the pipe 32.

A self-engaging latch 98 on the top of the pipe 32 engages the extension pipe flange 96 when the after end portion 99 of the extension pipe 95 is slid over the forward end portion 94 of the pipe 32 and the extension pipe flange 96 comes into abutment with the pipe flange 97. The combination of the latch 98 and the pipe flange 97 immobilizes the extension pipe 95 during the filling cycle of the mesh tube 85.

The plastic nesting material is preferably installed on the extension pipe 95 prior to mounting the extension pipe 95 on the forward end portion 94 of the pipe 32.

By previously assembling a plurality of mesh tubes 85 on a respective plurality of extension pipes 95, production is greatly speeded up. In other words, as each filling cycle is completed and the after end of the finished straw tube is closed, the product is removed for transfer to storage or other location, and the extension pipe 95 (from which the netting material has been totally removed by the end of the cycle) is unlatched by appropriately tilting the knobbed handle of the latch lever 100. The extension pipe 95 is then translated forwardly and removed from the pipe 32, thereby allowing a previously fitted extension pipe 95 to be inserted on the pipe 32 and urged in an after direction to effect latching, preparatory to commencing the next filling cycle.

The mesh netting material preferably has a strand thickness of 0.030 inch, a knot thickness of 0.055 inch and a unit weight of approximately 0.35 ounces per foot; and is made, for example, from 85% high density polyethylene, 14% ethyl vinyl acetate and 1% color (e.g. black or dark green) for ultra-violet inhibition. The mesh is purchased in the form of tubes nine inches in diameter and of any suitable length, such as one thousand feet, in the form of a roll. As each twenty-five foot length of tube is cut off the roll, the after end of the mesh tube is gathered on the extension pipe 95, as indicated in FIG. 1 and the forward end is closed, as by a hog ring (not shown).

At the instant the filling cycle is commenced, the closed forward end of the mesh tube is adjacent and substantially co-planar with the forward end 101 of the extension pipe 95. The extension pipe 95, having been previously filled with compressed straw in a prior cycle, therefore begins to extrude compressed straw against the closed forward end 84 of the mesh tube almost immediately after the cycle is commenced. FIG. 1 represents a stage in the filling cycle in which about two to three feet of mesh tube has been filled with compressed straw, with about twenty two to twenty three feet of netting still remaining on the extension pipe 95, most of the netting being closely gathered, as appears in FIG. 1, on the mid-portion of the extension pipe 95.

It should be noted that while the two or three feet of filled tube extending forwardly from the forward end 101 of the extension pipe appears to be coaxial with the axis of the extension pipe 95 in FIG. 1, in actual operation, the straw-filled tube is not rigid. In fact, the bottom of the extension pipe 95 is located about two inches, or so, above the surface of the elongated support table; and when the straw-filled tube begins to lengthen, it is flexible enough so that it bends downwardly until it touches and is supported by the underlying table 17 as the filled tube extends its full length of twenty-five feet.

Upon reaching its full length, the after end of the straw filled tube clears the forward end 101 of the extension pipe, and the filling portion of the cycle is completed. At this juncture, the after end of the mesh netting is tightly closed, as with a hog ring (not shown) so that the after end of the straw tube resembles the forward end 84, as shown in FIG. 1. The closed straw-filled mesh tube, about twenty-five feet in length and nine inches in diameter, can then be lifted from the elongated table 17 and moved elsewhere for storage, as previously indicated.

It can thereby be seen that the machine and process disclosed herein not only beneficially utilizes large quantities of rice straw, which heretofore has often been disposed of by burning, but the product thereof is itself an eminently cost effective means for controlling erosion and promoting environmental revegetation.

What is claimed is:

1. Machine for producing a straw-filled tube of flexible netting material comprising:

a. a longitudinal frame extending from a first end to a second end;

b. a transverse table mounted on said frame intermediate said first end and said second end thereof, said table being inclined from an upper portion toward a lower portion;

c. a pipe mounted longitudinally on said frame, said pipe including a lateral opening facing the inclined surface of said table adjacent the lower portion thereof, said pipe also including an axial discharge opening adjacent said second end of said frame;

d. an auger;

e. means for rotatably mounting said auger within said pipe so that straw placed on the inclined surface of said table is gravitationally disposed to move down said surface and to enter said lateral opening in said pipe and to engage said auger for movement through said pipe forwardly toward said discharge opening;

f. means mounted on said frame for driving said auger; and, g. means mounted on said table for advancing loose straw from said upper portion of said table toward said lower portion thereof and through said lateral opening in said pipe for engagement with said auger.

2. Machine as in claim 1 in which said straw advancing means includes a plurality of fluted rollers mounted for rotation on said table on axes parallel to the longitudinal axis of said pipe for engaging and urging the loose straw through said lateral opening and into engagement with said auger.

3. Machine as in claim 2 including means for adjusting the extent of compaction of the straw within the tube of netting material.

4. Machine as in claim 3 in which said compaction adjusting means includes means for axially positioning said auger within said pipe whereby shifting said auger forwardly results in a decrease in the extent of straw compaction and shifting said auger in an after direction results in an increase in straw compaction.

5. Machine for producing a straw-filled tube of flexible netting material comprising:
   a. an elongated frame extending from a forward end to an after end;
   b. a pipe mounted longitudinally on said frame, said pipe extending from a front end to a rear end, said pipe including an opening intermediate said front end and said rear end;
   c. an auger mounted for rotation within said pipe;
   d. means for rotating said auger for discharge through said front end of said pipe;
   e. means for introducing loose straw through said opening in said pipe for engagement with said auger, said loose straw introducing means comprising a chute extending from an open upper end to a lower end substantially coextensive with said opening in said pipe; and,
   f. means for positioning a tube of flexible netting material adjacent said front end of said pipe so that the straw emerging from said auger fills the tube with straw, the front end of the tube being closed prior to filling, said tube positioning means comprising an extension pipe detachably mounted on said front end of said pipe in coaxial relation therewith, the outer diameter of said extension pipe being approximately equal to the diameter of said flexible tube so that the portion of said tube aft of the closed front end can be snugly gathered on said extension pipe.

* * * * *